(12) United States Patent
Laplagne et al.

(10) Patent No.: US 9,252,694 B2
(45) Date of Patent: Feb. 2, 2016

(54) METHOD AND APPARATUS FOR DETECTING A STATE OF AN ALTERNATOR REGULATOR

(71) Applicants: Thierry Michel Laplagne, Cugnaux (FR); Eric Pierre Rolland, Grepiac (FR); Yean Ling Teo, Goyrans (FR)

(72) Inventors: Thierry Michel Laplagne, Cugnaux (FR); Eric Pierre Rolland, Grepiac (FR); Yean Ling Teo, Goyrans (FR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/496,647

(22) Filed: Sep. 25, 2014

(65) Prior Publication Data

US 2015/0311842 A1 Oct. 29, 2015

(30) Foreign Application Priority Data

Apr. 25, 2014 (WO) .................. PCT/IB2014/000804

(51) Int. Cl.
*H02K 11/00* (2006.01)
*H02P 11/00* (2006.01)
*H02P 9/02* (2006.01)
*H02P 9/00* (2006.01)
*H02H 7/06* (2006.01)

(52) U.S. Cl.
CPC . *H02P 9/02* (2013.01); *H02P 9/006* (2013.01)

(58) Field of Classification Search
USPC ................ 322/28, 99; 315/247, 307; 361/160
See application file for complete search history.

(56) References Cited

U.S. PATENT DOCUMENTS

| | | | |
|---|---|---|---|
| 5,376,876 A | 12/1994 | Bauser et al. | |
| 5,449,999 A | 9/1995 | Edwards | |
| 5,559,395 A * | 9/1996 | Venkitasubrahmanian | H05B 37/0263 315/209 R |
| 5,604,411 A * | 2/1997 | Venkitasubrahmanian | H05B 41/28 315/224 |
| 6,208,497 B1 * | 3/2001 | Seale | F01L 9/04 361/154 |
| 6,252,784 B1 * | 6/2001 | Dobrenko | H04M 19/02 363/21.12 |
| 6,942,469 B2 * | 9/2005 | Seale | F01L 9/04 417/413.1 |
| 6,952,355 B2 * | 10/2005 | Riggio | H02M 1/4225 363/21.15 |
| 7,075,276 B2 * | 7/2006 | Morales | H02M 3/1588 323/246 |
| 7,745,970 B2 * | 6/2010 | Radecker | H02M 7/537 310/316.01 |
| 7,746,671 B2 * | 6/2010 | Radecker | H02M 3/33507 323/244 |

(Continued)

FOREIGN PATENT DOCUMENTS

EP 0577994 A1 1/1994
WO 95/34949 A1 12/1995

*Primary Examiner* — Pedro J Cuevas

(57) ABSTRACT

A detection circuit for an alternator regulator, and method therefor. The detection circuit comprises an input circuit arranged to receive a phase signal from an alternator regulator and to output an attenuated sense signal representative of the received phase signal, a detection component operably coupled to the input circuit and arranged to receive the attenuated sense signal output by the input circuit, and a blocking capacitance operably coupled between the input circuit and the detection component and arranged to block a DC component of the attenuated sense signal. The detection component is arranged to compare the received attenuated sense signal to at least one reference voltage signal, and to output a signal representative of a frequency of the phase signal from the alternator regulator based at least partly on the comparison of the received attenuated sense signal to the at least one reference voltage signal.

20 Claims, 7 Drawing Sheets

(56) References Cited

U.S. PATENT DOCUMENTS

| | | | | |
|---|---|---|---|---|
| 7,969,754 B2 * | 6/2011 | Radecker | ......... | H02M 3/33507 323/244 |
| 2001/0043450 A1 * | 11/2001 | Seale | ........................ | F01L 9/04 361/160 |
| 2005/0001600 A1 * | 1/2005 | Morales | .............. | H02M 3/1588 323/282 |
| 2006/0171091 A1 * | 8/2006 | Seale | ........................ | F01L 9/04 361/160 |
| 2006/0285366 A1 * | 12/2006 | Radecker | ......... | H02M 3/33507 363/16 |
| 2007/0024254 A1 * | 2/2007 | Radecker | .............. | H02M 7/537 323/247 |
| 2010/0135049 A1 * | 6/2010 | Radecker | ......... | H02M 3/33507 363/21.03 |

\* cited by examiner

METHOD AND APPARATUS FOR DETECTING A STATE OF AN ALTERNATOR REGULATOR

CROSS REFERENCE TO RELATED APPLICATION(S)

The present application claims priority to International Patent Application No. PCT/IB2014/000804, entitled "METHOD AND APPARATUS FOR DETECTING A STATE OF AN ALTERNATOR REGULATOR," filed on Apr. 25, 2014, the entirety of which is herein incorporated by reference.

FIELD OF THE INVENTION

This invention relates to a method and apparatus for detecting a state of an alternator regulator, and in particular to a detection circuit for an alternator regulator.

BACKGROUND OF THE INVENTION

In alternator based charging systems, such as those used in automotive applications and the like, it is often necessary to detect a state of the alternator rotation for control purposes etc. Conventional detection circuits typically use the voltage signals from two phases of the alternator in order to reject the DC common mode voltage that can occur on the phase signals output by the alternator. For example, and as illustrated in FIG. 1, a typical three phase alternator regulator 100 generates three phase signals 112, 114, 116, the three phase signals 112, 114, 116 comprising cyclic voltages that are shifted in phase by 120 degrees relative to one another. Two of the three phase signals 112, 114 are provided to a detection component 120. FIG. 2 illustrates the two phase signals 112, 114 received by the detection component 120, which in FIG. 2 comprise a 3V common mode voltage. The detection component 120 derives a difference voltage, illustrated at 210 in FIG. 2, between the two phase signals 112, 114. The difference voltage 210 is immune to the DC common mode voltage, whilst having the same frequency as the individual phase signals 112, 114, 116 and thereby enabling the state of the alternator rotation to be detected without interference from any common mode voltage present within the two phase signals 112, 114.

Customer requirements and demands have given rise to a continued drive towards alternator rotation detection solutions that are lower cost, are less prone to defects and have better immunity to noise. Any such solution must also compensate for DC common mode voltages within the phase signals.

SUMMARY OF THE INVENTION

The present invention provides a detection circuit for an alternator regulator and a method of detecting a state of an alternator regulator as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
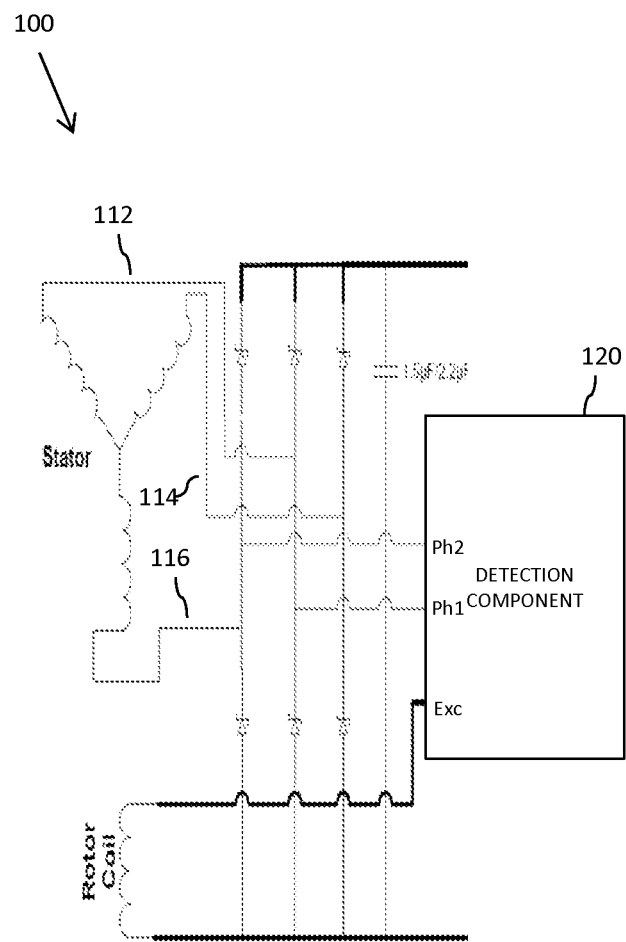
FIG. 1 illustrates a conventional architecture for detecting a state of an alternator regulator.
Figure 2:
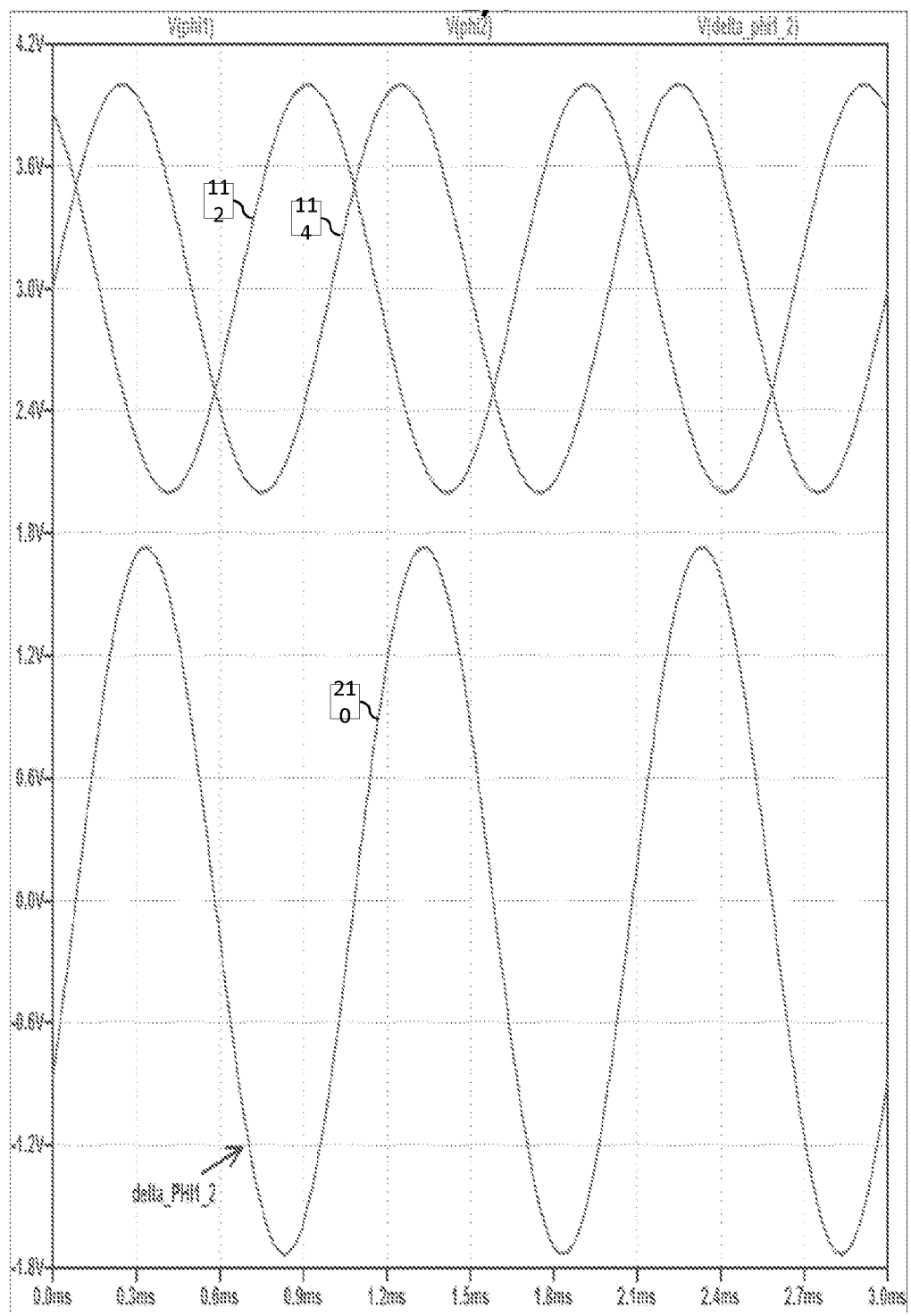
FIG. 2 illustrates timing signals received by a detection component of the architecture of FIG. 1

The present invention will now be described with reference to the accompanying drawings in which there is illustrated an example of a detection circuit for detecting a state of an alternator regulator. However, it will be appreciated that the present invention is not limited to the specific embodiments herein described and as illustrated in the accompanying drawings, and various alterations and modifications may be made without departing from the inventive concept.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of a first aspect of the present invention, there is provided a detection circuit for an alternator regulator. The detection circuit comprises an input circuit arranged to receive a phase signal from an alternator regulator and to output an attenuated sense signal representative of the received phase signal, a detection component operably coupled to the input circuit and arranged to receive the attenuated sense signal output by the input circuit, and a blocking capacitance operably coupled between the input circuit and the detection component and arranged to block a DC component of the attenuated sense signal. The detection component is arranged to compare the received attenuated sense signal to at least one reference voltage signal, and to output a signal representative of a frequency of the phase signal from the alternator regulator based at least partly on the comparison of the received attenuated sense signal to the at least one reference voltage signal.

In this manner, by attenuating the phase signal received from the alternator regulator, the voltage levels that the subsequent internal components, for example the blocking capacitance, of the detection circuit are required to tolerate may be reduced. As such, smaller components may be used to implement the detection circuit, reducing the size, cost and power consumption of the detection circuit. Thus, a small and low cost detection circuit is achievable that is able to compensate for DC common mode voltages within the phase signal.

In some example embodiments, the input circuit may comprise a high input impedance. For example, the input circuit may comprise a high impedance voltage divider circuit.

In some example embodiments, the input circuit may comprise an input clamp component arranged to clamp the attenuated sense signal to within a maximum voltage level.

In some example embodiments, the input clamp component may be arranged to clamp the attenuated sense signal to a maximum modulus voltage level.

In some example embodiments, the input circuit may comprise a low pass filter component arranged to apply low pass filtering to the attenuated sense signal output thereby.

In some example embodiments, the detection component may be arranged to apply a bias voltage to the received attenuated sense signal, and to compare the biased attenuated sense signal to the at least one reference voltage signal derived from the bias voltage.

In some example embodiments, the detection component may comprise a comparison circuit arranged to compare the received attenuated sense signal to a first offset reference voltage signal, and to output a first comparison signal based on the comparison of the attenuated sense signal to the first offset reference voltage signal, and compare the received attenuated sense signal to a second offset reference voltage signal, and to output a second comparison signal based on the comparison of the attenuated sense signal to the second offset reference voltage signal. The detection component may also be arranged to output the signal representative of the frequency of the phase signal from the alternator regulator based at least partly on the first and second comparison signals.

In some example embodiments, the detection component may comprise a set-reset flip-flop arranged to receive at inputs thereof the first and second comparison signals, and to output the signal representative of the frequency of the phase signal from the alternator regulator.

In some example embodiments, the first offset reference voltage signal may comprise a voltage greater than a bias voltage Vref by a reference voltage difference $\Delta Vth$ and the second offset reference voltage signal may comprise a voltage less than the bias voltage Vref by the reference voltage difference $\Delta Vth$, such that the first offset reference voltage signal is equal to Vref+$\Delta Vth$ and the second offset reference voltage signal is equal to Vref−$\Delta Vth$.

In some example embodiments, the detection component may comprise a voltage divider circuit operably coupled between a high voltage node and a low voltage node; the voltage divider circuit comprising:
  a first node arranged to provide the bias voltage Vref;
  a second node operably coupled to the first node via a first resistance and to the high voltage node and arranged to provide the first offset reference voltage; and
  a third node operably coupled to the first node via a second resistance and to the low voltage node and arranged to provide the second offset reference voltage.

In some example embodiments, the detection component may comprise a sense clamp component arranged to clamp the attenuated sense signal received thereby to within a sense clamp voltage difference $\Delta Vsns$ of the bias voltage Vref, such that the sense signal is clamped to within $\pm\Delta Vsns$ of the bias voltage Vref.

In some example embodiments, the sense clamp voltage difference $\Delta Vsns$ may be greater than the reference voltage difference $\Delta Vth$.

In some example embodiments, the sense clamp component may comprise two diode structures operably coupled in parallel between the input of the detection component at which the attenuated sense signal is received and a source node of the bias voltage Vref, and facing in opposite directions.

In some example embodiments, the detection circuit may be implemented within an integrated circuit device comprising at least one die within a single integrated circuit package.

According to some examples of a second aspect of the present invention, there is provided a method of detecting a state of an alternator regulator. The method comprises:
  receiving a phase signal from the alternator regulator;
  attenuating the received phase signal to produce an attenuated sense signal representative of the received phase signal;
  blocking a DC component of the attenuated sense signal;
  comparing the attenuated sense signal to at least one reference voltage signal; and
  generating a signal representative of a frequency of the received phase signal based at least partly on the comparison of the received attenuated sense signal to the at least one reference signal.

Figure 3:
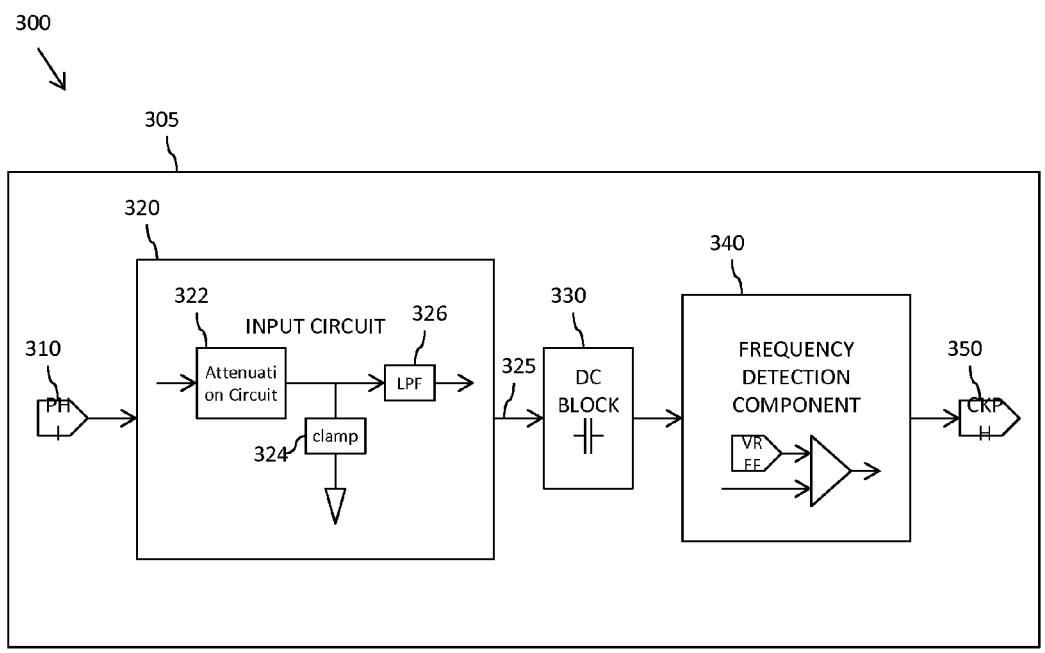
FIG. 3 illustrates a simplified block diagram of an example of a detection circuit.

Referring now to FIG. 3, there is illustrated a simplified block diagram of an example of a detection circuit 300 for an alternator regulator (not shown). In the illustrated example, the detection circuit 300 is implemented within an integrated circuit device 305 comprising at least one die within a single integrated circuit package. The detection circuit 300 comprises an input circuit 320 arranged to receive a phase signal 310 from an alternator regulator (not shown) and to output an attenuated sense signal 325 representative of the received phase signal 310. In the illustrated example, the input circuit 320 comprises an attenuation circuit 322 arranged to receive the phase signal 310 and to attenuate the phase signal 310 to produce a reduced voltage version of the phase signal 310. In this manner, by attenuating the phase signal 310 received from the alternator regulator, the voltage levels that the subsequent internal components of the detection circuit 300 are required to tolerate may be reduced. As such, smaller components may be used to implement the detection circuit 300, reducing the size, cost and power consumption of the detection circuit 300. In some examples, it is contemplated that the sense signal may be attenuated down to a peak voltage level substantially equal to a supply voltage VDD (not shown) for the integrated circuit device 305 within which the detection circuit 300 is implemented.

The attenuation circuit 322 may be implemented in any suitable manner. For example, and as described in greater detail with reference to FIG. 4, the attenuation circuit 322 may comprise a voltage divider circuit. In some examples, the attenuation circuit 322 comprises a high input impedance, thereby providing the input circuit 320 with a high input impedance in order to minimise the input current for the detection circuit 300.

The reduced voltage version of the phase signal 310 is output by the input circuit 320 to provide the attenuated sense signal 325. The input circuit 300 may further comprise an input clamp component 324 arranged to clamp the attenuated sense signal 325 to within a maximum voltage level. For example, the clamp component may be arranged to clamp the attenuated sense signal 325 to a maximum modulus voltage level (i.e. both positive and negative voltage levels). In this manner, damagingly high voltage levels for the internal components may be avoided.

In the illustrated example, the input circuit 300 further comprises a low pass filter 326 to apply low pass filtering to the attenuated sense signal 325 output thereby. In this manner, high frequency parasitic signals which are present in, for example, automotive environments may be filtered out to improve the noise immunity of the detection circuit.

The detection circuit 300 comprises a detection component 340 operably coupled to the input circuit 320 and arranged to receive the attenuated sense signal 325 output by the input circuit 320. The detection circuit 300 further comprises a blocking capacitance 330 operably coupled between the input circuit 320 and the detection component 340 and arranged to block DC components of the attenuated sense signal 325. Advantageously, because the sense signal has previously been attenuated by the input circuit 320, the required size of the blocking capacitance 330 may be reduced, thereby enabling a significant reduction in the die area required for implementing the blocking capacitance 330.

In this manner, the DC common mode component of the phase signal 310 is removed from the attenuated sense signal 325 received by the detection component 340, and the detection component 340 receives an attenuated sense signal 325 from which the DC common mode component of the phase signal 310 has been removed. Accordingly, the detection component 340 may simply be arranged to compare the received attenuated sense signal 325 to a reference voltage in order to detect a frequency of the phase signal 310. For example, the detection component 340 may be arranged to apply a bias voltage to the received attenuated sense signal 325. The detection component 340 may then compare the biased attenuated sense signal 325 to a reference voltage derived from the bias voltage to detect oscillations in the attenuated sense signal 325, and thus in the phase signal 310. As such, the detection component 340 illustrated in FIG. 3 is arranged to output a signal 350 representative of a frequency of the phase signal 310 from the alternator regulator based at least partly on a comparison of the received attenuated sense signal 325 to at least one reference voltage signal.

Figure 4:
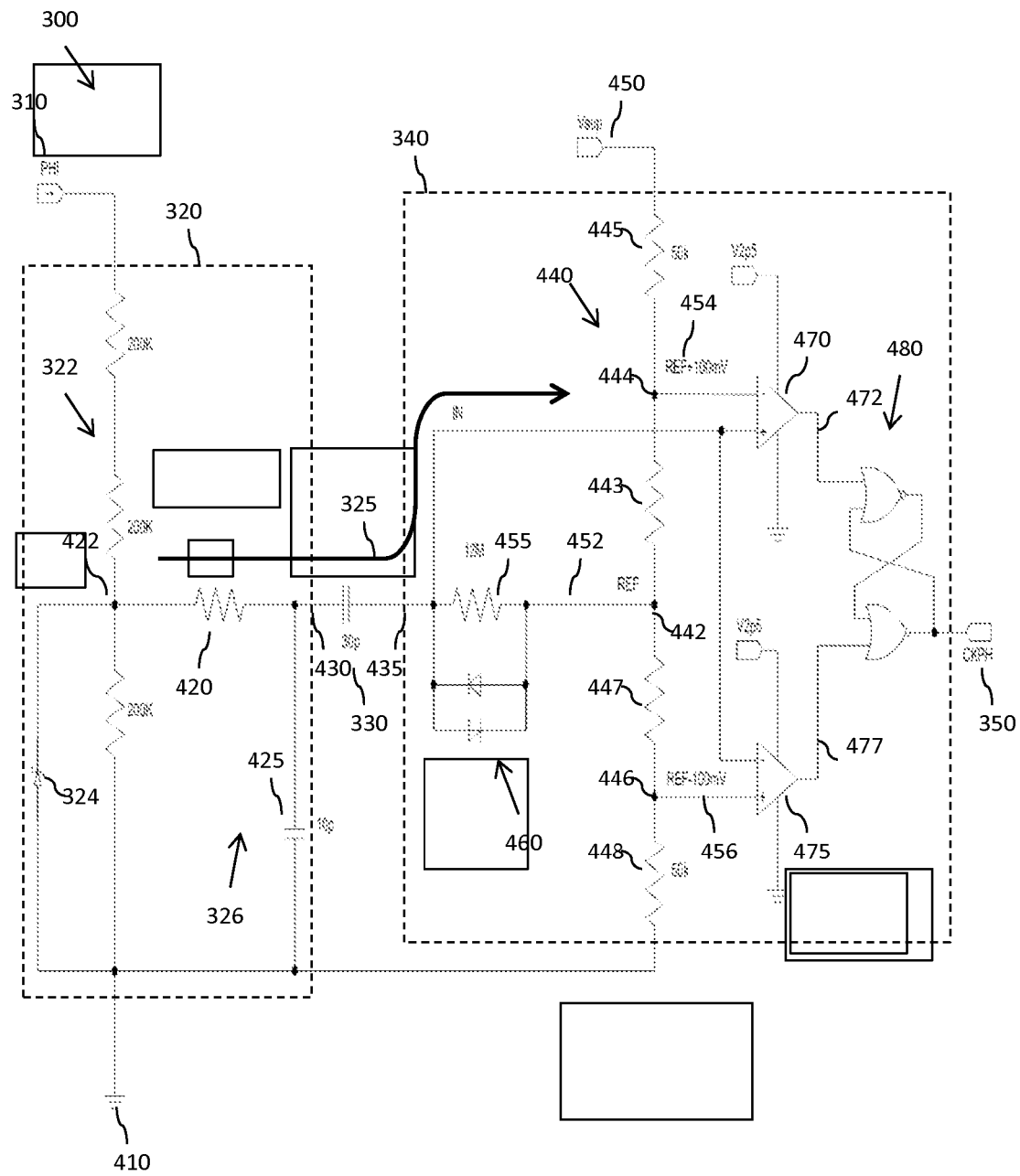
FIG. 4 illustrates a simplified circuit diagram of an example of the detection circuit of FIG. 3.

Referring now to FIG. 4, there is illustrated a simplified circuit diagram of an example of the detection circuit 300 of FIG. 3. In the example illustrated in FIG. 4, the input circuit 320 comprises an attenuation circuit 322 in the form of a high impedance voltage divider circuit. An input clamp component 324 comprising a Zener diode is operably coupled between an output node 422 of the attenuation circuit 322 and a ground plane 410. A low pass filter 325 is implemented by way of a simple RC circuit comprising a resistor 420 operably coupled in series between the output node 422 of the attenuation circuit 322 and an output node 430 of the input circuit 320, and a capacitor 425 operably coupled between the output node 430 of the input circuit 320 and the ground plane 410.

Figure 5:
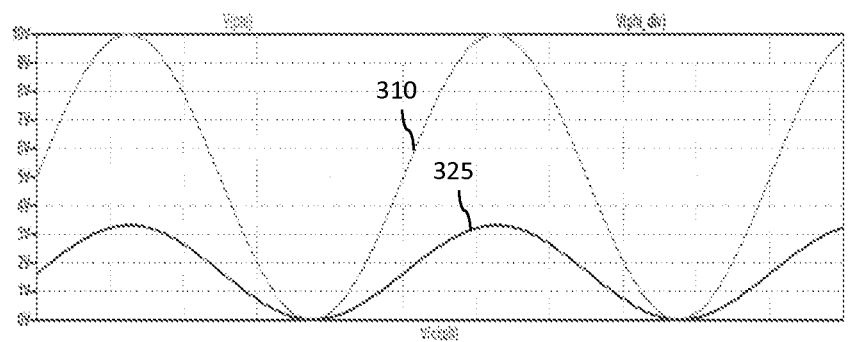
FIG. 5 illustrates a simplified graph showing an example of an alternator regulator phase signal and an attenuated sense signal.

FIG. 5 illustrates a simplified graph showing an example of the phase signal 310 and of the attenuated sense signal 325 output by the input circuit 320. As can be seen in FIG. 5, the attenuated sense signal 325 retains the frequency of the phase signal 310, but comprises a reduced voltage level. In the illustrated example, the attenuated sense signal 325 has been attenuated to a peak voltage of approximately 3.3V; such an attenuated peak voltage being substantially equal to the typical supply voltage for integrated circuit devices.

Referring back to FIG. 4, the detection component 340 comprises a further voltage divider circuit 440 operably coupled between a high voltage node, which in the illustrated example comprises a voltage supply node 450, and a low voltage node, which in the illustrated example comprises the ground plane 410. A first node 442 of the voltage divider circuit 440 within the detection component 340 is arranged to provide a bias voltage Vref 452. The first node 442 of the voltage divider circuit within the detection component 340 is operably coupled, via resistor 455, to an input 435 of the detection component 340 at which the attenuated sense signal 325 is received. In this manner, the bias voltage Vref 452 is applied to the received attenuated sense signal 325.

The detection component 340 further comprises a sense clamp component 460 arranged to clamp the attenuated sense signal 325 received thereby to within a sense clamp voltage difference $\Delta$Vsns of the bias voltage Vref 452, such that the sense signal 325 is clamped to within $\pm\Delta$Vsns of the bias voltage Vref 452. In the illustrated example, the sense clamp component 460 comprises two diode structures operably coupled in parallel between the input 435 of the detection component 340 and the first node 442 of the voltage divider, and facing in opposite directions. In this manner, the sense clamp voltage difference $\Delta$Vsns is equal to the bias voltage of the individual diodes, for example approximately 0.45V.

A second node 444 of the voltage divider circuit 440 within the detection component 340 is operably coupled to the first node 442 via a first resistance 443. A third node 446 of the voltage divider circuit 440 within the detection component 340 is operably coupled to the first node 442 via a second resistance 447. The second node 444 is further operably coupled to the voltage supply node 450 via a further resistance 445, and is arranged to provide a first offset reference voltage. The third node 444 is further operably coupled to the ground plane 410 via a further resistance 448, and is arranged to provide a second offset reference voltage.

In the illustrated example, the first offset reference voltage provided by the second node 444 of the voltage divider circuit 440 comprises a voltage greater than the bias voltage Vref 452 by a reference voltage difference $\Delta$Vth (100 mV in the example illustrated in FIG. 4), whilst the second offset reference voltage provided by the third node 446 of the voltage divider circuit 440 comprises a voltage less than the bias voltage Vref 452 by the reference voltage difference $\Delta$Vth, such that the first offset reference voltage signal 454 is equal to Vref+$\Delta$Vth and the second offset reference voltage signal 456 is equal to Vref−$\Delta$Vth. Thus, the first offset reference voltage signal 454 in the illustrated example comprises a positive offset relative to the bias voltage Vref 452, whilst the second offset reference voltage signal 456 in the illustrated example comprises a negative offset relative to the bias voltage Vref 452.

Figure 6:
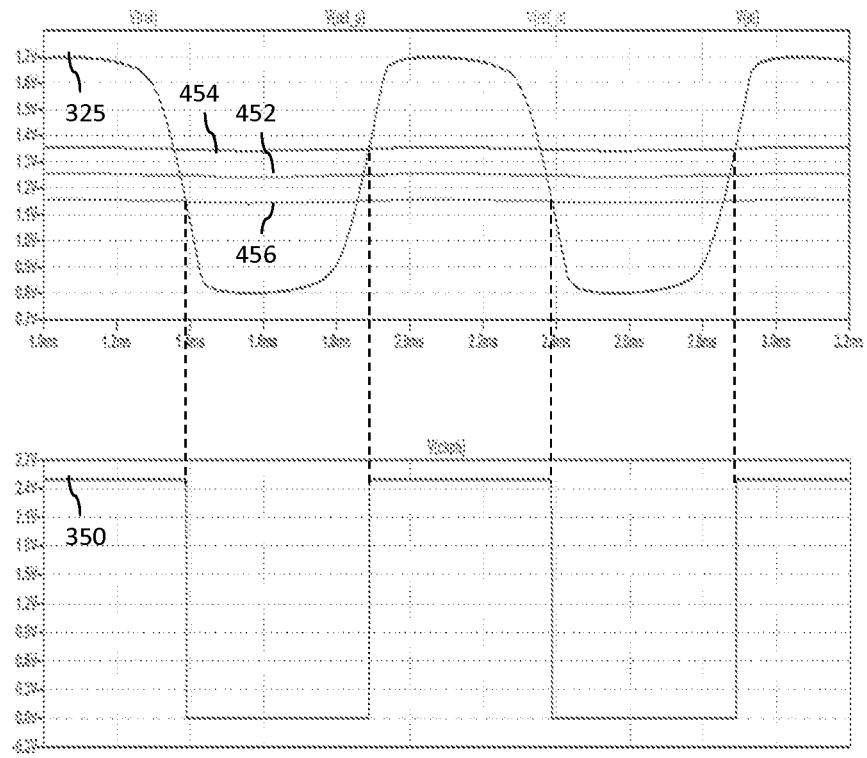
FIG. 6 illustrates a simplified graph of an example of timing of signals within a detection component of FIG. 4.

FIG. 6 illustrates a simplified graph of an example of the timing of signals within the detection component 340 of FIG. 4. A first plot illustrates the bias voltage Vref 452, which in the illustrated example comprises a substantially constant voltage of approximately 1.25V. The first and second offset reference voltage signals 454, 456 comprise voltages equal to the bias voltage±a reference voltage difference $\Delta$Vth of 100 mV. The plot representing the biased and clamped attenuated sense signal 325 shows the attenuated sense signal 325 being substantially centred around the bias voltage Vref 452 at 1.25V, and clamped to within ±a sense clamp voltage difference $\Delta$Vsns of 0.45V from the bias voltage Vref 452.

Referring back to FIG. 4, the detection component 340 of the example illustrated in FIG. 4 comprises a comparison circuit comprising a first comparator component 470 and a second comparator component 475. The first comparator component 470 is arranged to receive the biased and clamped attenuated sense signal 325 and the first offset reference voltage and to output a first comparison signal 472 based on the comparison of the attenuated sense signal to the first offset reference voltage signal 454. The second comparator component 475 is arranged to receive the biased and clamped attenuated sense signal 325 and the second offset reference voltage and to output a second comparison signal 477 based on the comparison of the attenuated sense signal 325 to the second offset reference voltage signal 456.

In the illustrated example, the first comparison component 470 receives at a non-inverting input thereof the biased and clamped attenuated sense signal 325, and at an inverting input thereof the first offset reference voltage. In this manner, the first comparison component 470 in the illustrated example is arranged to output a logical 'high' (e.g. '1') signal when the biased and clamped attenuated sense signal 325 comprises a voltage higher than the first offset reference voltage signal 454, and a logical low' (e.g. '0') signal when the biased and clamped attenuated sense signal 325 comprises a voltage lower than the first offset reference voltage signal 454.

In the illustrated example, the second comparison component 475 receives at an inverting input thereof the biased and clamped attenuated sense signal 325, and at a non-inverting input thereof the second offset reference voltage. In this manner, the second comparison component 475 in the illustrated example is arranged to output a logical 'high' (e.g. '1') signal when the biased and clamped attenuated sense signal 325 comprises a voltage lower than the second offset reference voltage signal 456, and a logical low' (e.g. '0') signal when the biased and clamped attenuated sense signal 325 comprises a voltage higher than the second offset reference voltage signal 456.

In the example illustrated in FIG. 4, the detection component 340 comprises a set-reset flip-flop component 480 arranged to receive at inputs thereof the first and second comparison signals 472, 477, and to output the signal 350 representative of a frequency of the phase signal 310 from the alternator regulator. Referring back to FIG. 6, the signal output by the flip-flop component 480 is illustrated at 350. As can be seen, in the illustrated example the flip-flop component 480 is arranged to transition the signal 350 output thereby from a first logical state (a high logical state in the illustrated example) to a second logical state (a low logical state in the illustrated example) upon the biased and clamped attenuated sense signal 325 falling below the second offset reference signal 456, and to transition the signal 350 output thereby from the second logical state to the first logical state upon the biased and clamped attenuated sense signal 325 rising above the first offset reference signal 454. In this manner, the signal 350 output by the detection component 340 comprises a digital signal representative of the frequency of the attenuated sense signal 325, and thus of the phase signal 310 received from the alternator regulator.

The use of offset reference voltage signals 454, 456 as illustrated in FIG. 4 improves the stability of the detection component 340 by reducing the likelihood of any noise etc. in the attenuated sense signal 325 triggering a false set/reset of the flip-flop component 480.

Figure 7:
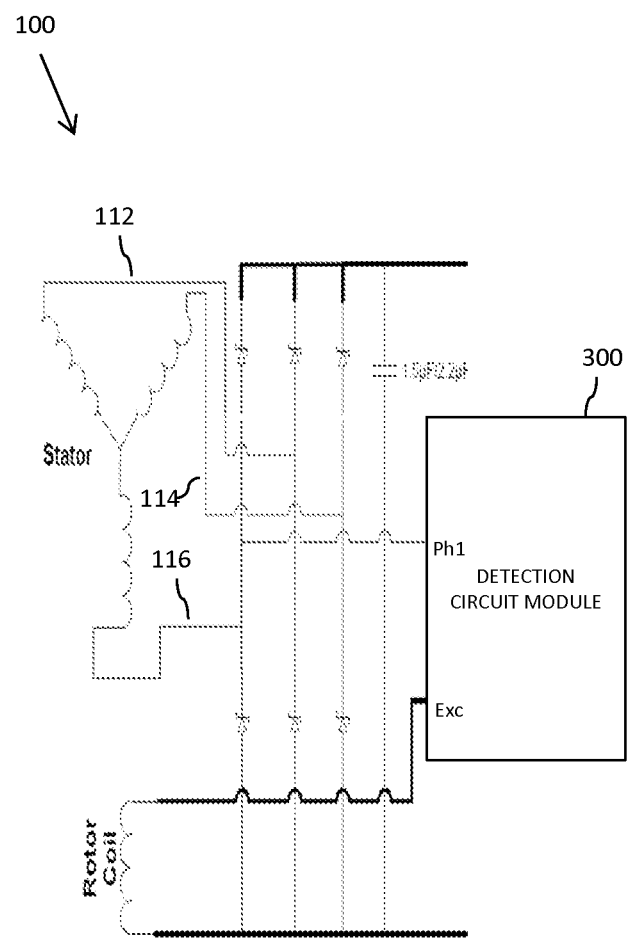
FIG. 7 illustrates an example of an architecture for detecting a state of an alternator regulator comprising the detection circuit of FIG. 3.

Referring now to FIG. 7, there is illustrated the same three phase alternator regulator 100 illustrated in FIG. 1 with reference to the prior art. However, in FIG. 7 a detection circuit according to the present invention, such as the detection circuit illustrated in FIGS. 3 and 4, is used to detect the state of the alternator rotation for control purposes etc. The alternator regulator 100 generates three phase signals 112, 114, 116, the three phase signals 112, 114, 116 comprising cyclic voltages that are shifted in phase by 120 degrees relative to one another. However, only one of the three phase signals 114 is required to be provided to the detection circuit 300, as opposed to two being required for the conventional detection component 120 of FIG. 1. As such, a simpler, lower cost architecture may be implemented, requiring less connections and that is less prone to defects and has better immunity to noise.

Figure 8:
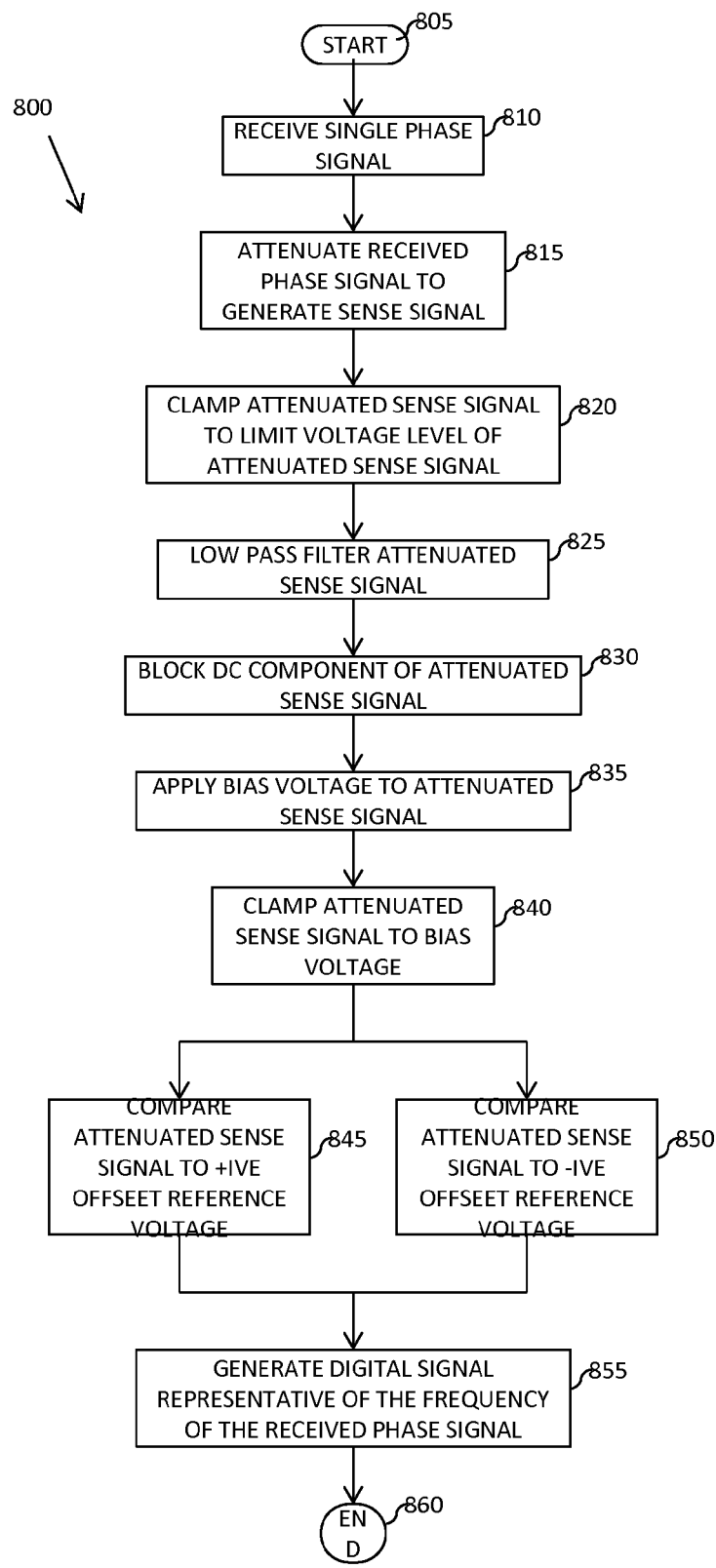
FIG. 8 illustrates a simplified flowchart of an example of a method of detecting a state of an alternator regulator.

Referring now to FIG. 8, there is illustrated a simplified flowchart 800 of an example of a method of detecting a state of an alternator regulator, such as may be implemented within the detection circuit of FIG. 3 and/or FIG. 4. The method starts at 805 and moves on to 810 with the receipt of a single phase signal from an alternator regulator. Next, at 815, the phase signal is attenuated to generate an attenuated sense signal. The attenuated sense signal is then clamped at 820, and low pass filtered at 825. A DC component of the attenuated sense signal is then blocked at 830, for example by passing the attenuated sense signal through a blocking capacitor. A bias voltage is then applied to the attenuated sense signal at 835, and the attenuated sense signal is clamped to the bias voltage at 840. The biased (and clamped) attenuated sense signal is then compared to a first offset reference voltage signal at 845, for example comprising a positive offset relative to the bias voltage, and to a second offset reference voltage signal at 850, for example comprising a negative offset relative to the bias voltage. A digital signal representative of the frequency of the received phase signal is then generated at 855 based at least partly on the comparison of the received attenuated sense signal to the offset reference signals. The method then ends, at 860.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the input circuit 320, blocking capacitance 330 of the detection circuit 300 of FIG. 3 have been illustrated and described as being implemented as circuitry located within a single integrated circuit device 305. Alternatively, the examples may be implemented as any number of separate integrated circuits or separate devices interconnected with each other in a suitable manner. For example, the input circuit 320, blocking capacitance 330 of the detection circuit 300 may be implemented within separate integrated circuit devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A detection circuit for an alternator regulator, the detection circuit comprising:
    an input circuit arranged to receive a phase signal from the alternator regulator and to output an attenuated sense signal representative of the received phase signal;
    a detection component operably coupled to the input circuit and arranged to receive the attenuated sense signal output by the input circuit; and
    a blocking capacitance operably coupled between the input circuit and the detection component and arranged to block a DC component of the attenuated sense signal,
    wherein the detection component is arranged to compare the received attenuated sense signal to at least one reference voltage signal, and to output a signal representative of a frequency of the phase signal from the alternator regulator based at least partly on the comparison of the received attenuated sense signal to the at least one reference voltage signal.

2. The detection circuit of claim 1, wherein the input circuit comprises a high input impedance.

3. The detection circuit of claim 2, wherein the input circuit comprises a high impedance voltage divider circuit.

4. The detection circuit of claim 1, wherein the input circuit comprises an input clamp component arranged to clamp the attenuated sense signal to within a maximum voltage level.

5. The detection circuit of claim 4, wherein the input clamp component is arranged to clamp the attenuated sense signal to a maximum modulus voltage level.

6. The detection circuit of claim 1, wherein the input circuit comprises a low pass filter component arranged to apply low pass filtering to the attenuated sense signal output thereby.

7. The detection circuit of claim 1, wherein the detection component is arranged to apply a bias voltage to the received attenuated sense signal, and to compare the biased attenuated sense signal to the at least one reference voltage signal derived from the bias voltage.

8. The detection circuit of claim 7, wherein the detection component comprises a set-reset flip-flop arranged to receive at inputs thereof the first and second comparison signals, and to output the signal representative of the frequency of the phase signal from the alternator regulator.

9. The detection circuit of claim 8, wherein the first offset reference voltage signal comprises a voltage greater than a bias voltage Vref by a reference voltage difference $\Delta$Vth and the second offset reference voltage signal comprises a voltage less than the bias voltage Vref by the reference voltage difference $\Delta$Vth, such that the first offset reference voltage signal is equal to Vref+$\Delta$Vth and the second offset reference voltage signal is equal to Vref−$\Delta$Vth.

10. The detection circuit of claim 8, wherein the detection component comprises a voltage divider circuit operably coupled between a high voltage node and a low voltage node; the voltage divider circuit comprising:
    a first node arranged to provide the bias voltage Vref;
    a second node operably coupled to the first node via a first resistance and to the high voltage node and arranged to provide the first offset reference voltage; and
    a third node operably coupled to the first node via a second resistance and to the low voltage node and arranged to provide the second offset reference voltage.

11. The detection circuit of claim 1, wherein the detection component comprises a comparison circuit arranged to:
    compare the received attenuated sense signal to a first offset reference voltage signal, and to output a first comparison signal based on the comparison of the attenuated sense signal to the first offset reference voltage signal; and compare the received attenuated sense signal to a second offset reference voltage signal, and to output a second comparison signal based on the comparison of the attenuated sense signal to the second offset reference voltage signal, wherein the detection component is arranged to output the signal representative of the frequency of the phase signal from the alternator regulator based at least partly on the first and second comparison signals.

12. The detection circuit of claim 11, wherein the first offset reference voltage signal comprises a voltage greater than a bias voltage Vref by a reference voltage difference ΔVth and the second offset reference voltage signal comprises a voltage less than the bias voltage Vref by the reference voltage difference ΔVth, such that the first offset reference voltage signal is equal to Vref+ΔVth and the second offset reference voltage signal is equal to Vref−ΔVth.

13. The detection circuit of claim 12, wherein the detection component comprises a sense clamp component arranged to clamp the attenuated sense signal received thereby to within a sense clamp voltage difference ΔVsns of the bias voltage Vref, such that the sense signal is clamped to within ±ΔVsns of the bias voltage Vref.

14. The detection circuit of claim 12, wherein the detection component comprises a voltage divider circuit operably coupled between a high voltage node and a low voltage node; the voltage divider circuit comprising:

a first node arranged to provide the bias voltage Vref;
a second node operably coupled to the first node via a first resistance and to the high voltage node and arranged to provide the first offset reference voltage; and
a third node operably coupled to the first node via a second resistance and to the low voltage node and arranged to provide the second offset reference voltage.

15. The detection circuit of claim 11, wherein the detection component comprises a voltage divider circuit operably coupled between a high voltage node and a low voltage node; the voltage divider circuit comprising:

a first node arranged to provide the bias voltage Vref;
a second node operably coupled to the first node via a first resistance and to the high voltage node and arranged to provide the first offset reference voltage; and
a third node operably coupled to the first node via a second resistance and to the low voltage node and arranged to provide the second offset reference voltage.

16. The detection circuit of claim 15, wherein the sense clamp voltage difference ΔVsns is greater than the reference voltage difference ΔVth.

17. The detection circuit of claim 15, wherein the sense clamp component comprises two diode structures operably coupled in parallel between the input of the detection component at which the attenuated sense signal is received and a source node of the bias voltage Vref, and facing in opposite directions.

18. The detection circuit of claim 15, wherein the detection component comprises a sense clamp component arranged to clamp the attenuated sense signal received thereby to within a sense clamp voltage difference ΔVsns of the bias voltage Vref, such that the sense signal is clamped to within ±ΔVsns of the bias voltage Vref.

19. The detection circuit of claim 1 implemented within an integrated circuit device comprising at least one die within a single integrated circuit package.

20. A method of detecting a state of an alternator regulator, the method comprising:

receiving a phase signal from the alternator regulator;
attenuating the received phase signal to produce an attenuated sense signal representative of the received phase signal;
blocking a DC component of the attenuated sense signal;
comparing the attenuated sense signal to at least one reference voltage signal; and
generating a signal representative of a frequency of the received phase signal based at least partly on the comparison of the received attenuated sense signal to the at least one reference signal.

* * * * *